(12) United States Patent
Zhang

(10) Patent No.: US 9,179,312 B2
(45) Date of Patent: Nov. 3, 2015

(54) REGISTRATION AND LOGIN METHOD AND MOBILE TERMINAL

(71) Applicant: TENCENT TECHNOLOGY (SHENZHEN) COMPANY LIMITED, Shenzhen, Guangdong Province (CN)

(72) Inventor: Bang-Hua Zhang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 14/164,042

(22) Filed: Jan. 24, 2014

(65) Prior Publication Data

US 2014/0141751 A1 May 22, 2014

Related U.S. Application Data

(63) Continuation of application No. PCT/CN2012/082875, filed on Oct. 12, 2012.

(30) Foreign Application Priority Data

Nov. 9, 2011 (CN) .......................... 2011 1 0352071

(51) Int. Cl.
*H04M 1/66* (2006.01)
*H04W 12/08* (2009.01)
*H04W 4/22* (2009.01)
*H04W 88/06* (2009.01)
*H04W 60/00* (2009.01)
*H04W 12/06* (2009.01)

(52) U.S. Cl.
CPC ................ *H04W 12/08* (2013.01); *H04W 4/22* (2013.01); *H04W 12/06* (2013.01); *H04W 60/00* (2013.01); *H04W 88/06* (2013.01)

(58) Field of Classification Search
CPC ........ H04W 12/08; H04W 88/06; H04W 4/22; H04W 60/00
See application file for complete search history.

(56) References Cited

U.S. PATENT DOCUMENTS

| | | | | |
|---|---|---|---|---|
| 2006/0206709 | A1* | 9/2006 | Labrou et al. | 713/167 |
| 2008/0159515 | A1 | 7/2008 | Rines | |
| 2010/0330903 | A1* | 12/2010 | Chabrerie | 455/39 |
| 2012/0221437 | A1* | 8/2012 | Yoo | 705/26.41 |
| 2012/0295580 | A1* | 11/2012 | Corner | 455/405 |

FOREIGN PATENT DOCUMENTS

| | | |
|---|---|---|
| CN | 101090548 A | 12/2007 |
| CN | 101155324 A | 4/2008 |
| CN | 102148769 A | 8/2011 |
| WO | 2013/067877 A1 | 5/2013 |

* cited by examiner

*Primary Examiner* — Khalid Shaheed
(74) *Attorney, Agent, or Firm* — Cheng-Ju Chiang

(57) ABSTRACT

A registration and login method executed by a mobile terminal is provided. The mobile terminal acquires a mobile phone number of the mobile terminal through a server in response to a registration operation, and encrypts the mobile phone number into a register file stored in the mobile terminal. The mobile phone number is inputted as a username to register to the server. The mobile phone number is acquired from the register file in response to a login operation and used as the username to log into the server. The mobile terminal includes an acquiring and encrypting module, a register module and a login module. Thus, a user need not input a username or a password, thereby simplifying the input operation during the registration and login process.

10 Claims, 4 Drawing Sheets

US 9,179,312 B2

REGISTRATION AND LOGIN METHOD AND MOBILE TERMINAL

CROSS-REFERENCE TO RELATED APPLICATION

This application is a continuation application of International (PCT) Patent Application No. PCT/CN2012/082875 filed on Oct. 12, 2012, now pending and designating the United States, which also claims benefit of China Patent Application No. 201110352071.4, filed on Nov. 9, 2011. The entirety of the above-mentioned patent applications is hereby incorporated by reference herein and made a part of this specification.

FIELD OF THE INVENTION

The present invention relates to mobile communication technical filed, and more particularly to a registration and login method and a mobile terminal.

BACKGROUND OF THE INVENTION

Recently, there are many mobile applications (Shorted as "app") designed for mobile terminals such as mobile phones. When registration and login process to a server is necessary to operate the mobile application or use a specific service provided by the server, a username and a password are usually required to identify the user. For registration process, the user has to specify a username and a password. For login process, the user has to enter the specified username and the password. Then, after the entered username and password are authenticated, the user is allowed to operate the mobile application or use the specific service.

However, it is inconvenient to enter characters of the username and the password through mobile terminals (e.g. mobile phones) during registration and login process. Input errors possibly occur and operation of the mobile terminal is seriously affected.

SUMMARY OF THE INVENTION

The present disclosure provides a registration and login method and a mobile terminal to simplify input operation during a registration and login process.

An aspect of the present application provides a registration and login method executed by a mobile terminal. At first, the mobile terminal acquires a mobile phone number of the mobile terminal through a server in response to a registration operation of a user, and encrypts the mobile phone number into a register file stored in the mobile terminal. The mobile phone number is inputted as a username to register to the server. The mobile phone number is acquired from the register file in response to a login operation of the user and used as the username to log into the server.

Another aspect of the present application provides a mobile terminal. The mobile terminal includes an acquiring and encrypting module, a register module and a login module. The acquiring and encrypting module is configured to acquire a mobile phone number of the mobile terminal through a server in response to a registration operation of a user, and encrypt the mobile phone number into a register file stored in the mobile terminal. The register module is configured to register to the server by inputting the mobile phone number as a username. The login module is configured to acquire the mobile phone number from the register file in response to a login operation of the user and log into the server by using the mobile phone number as the username.

BRIEF DESCRIPTION OF THE DRAWINGS

In order to describe the embodiments of the present invention more clearly, the accompanying drawings required for describing the embodiments are briefly introduced hereinafter. It is apparent that the accompanying drawings are only used for illustrating some of the embodiments of the present invention, and for those ordinarily skilled in the art, further drawings can be realized without additional inventive efforts.

DETAILED DESCRIPTION OF PREFERRED EMBODIMENTS

Hereinafter, combined with the accompanying drawings of the embodiments of the present invention, the technical solutions of the embodiments of the present invention are clearly and fully described. It should be noted that the embodiments are only some of the embodiments of the present invention other than all the embodiments. Based on the embodiments of the present invention, all the other embodiments derived therefrom without additional inventive efforts of an ordinarily skilled person in the art are included in the scope of the present invention.

Figure 1:
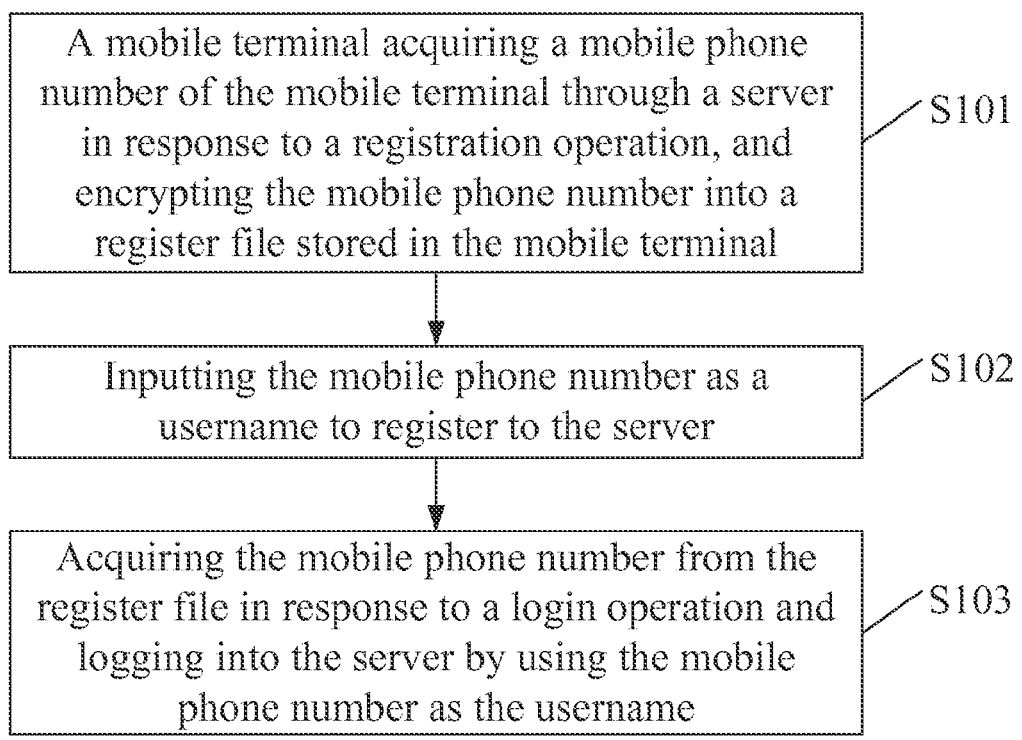
FIG. 1 is a flow chart illustrating an embodiment of a registration and login method.

Please refer to FIG. 1, a flow chart illustrating an embodiment of a registration and login method. The steps of the registration and login method are described as follows.

In step S101, a mobile terminal acquires a mobile phone number of the mobile terminal through a server in response to a registration operation of the user, and encrypts the mobile phone number into a register file stored in the mobile terminal.

In step S102, the mobile phone number is inputted as a username to register to the server.

In step S103, the mobile phone number is acquired from the register file in response to a login operation of the user and used as the username to log into the server.

Figure 2A:
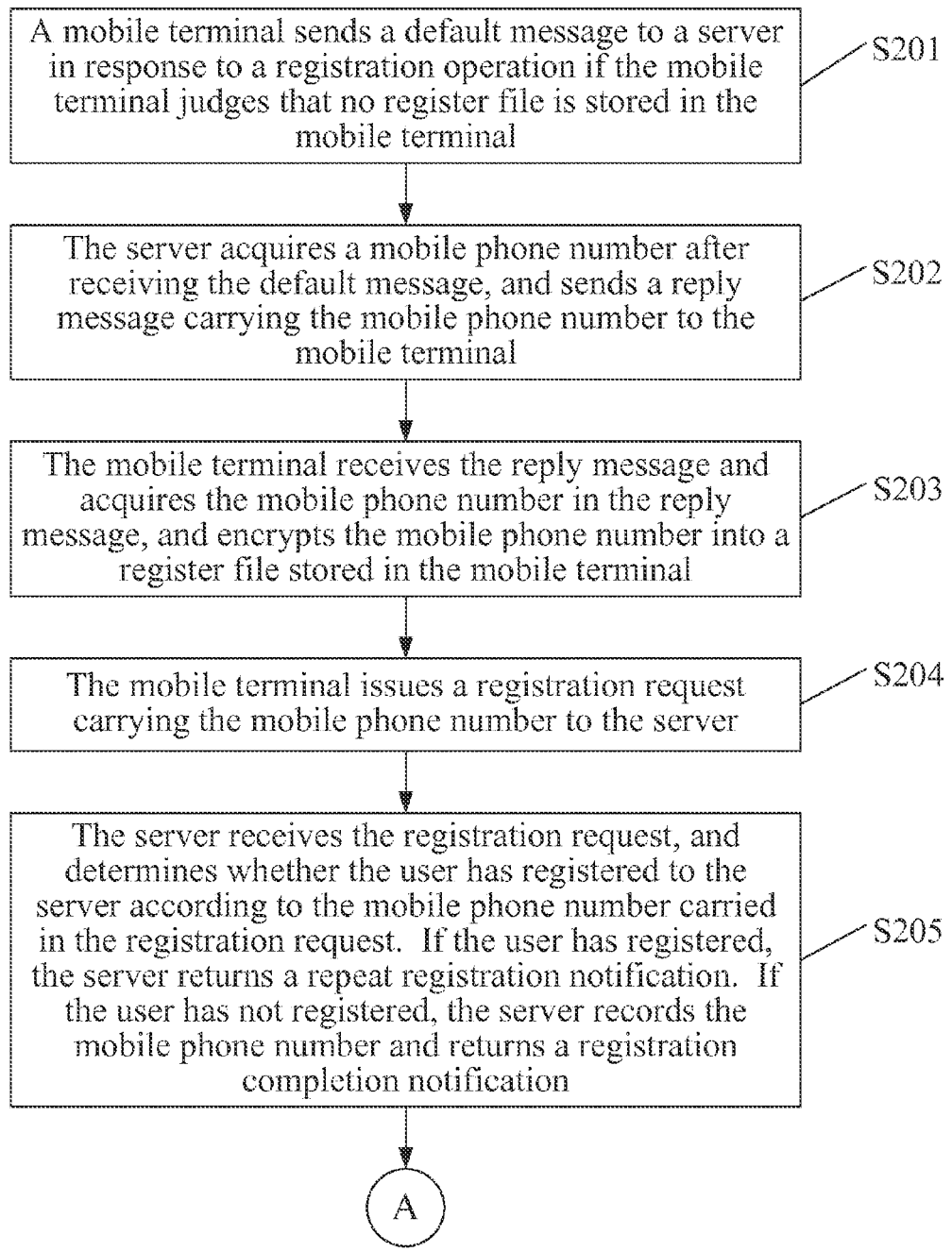
FIGS. 2A and 2B are flow charts illustrating another embodiment of a registration and login method.
Figure 2B:
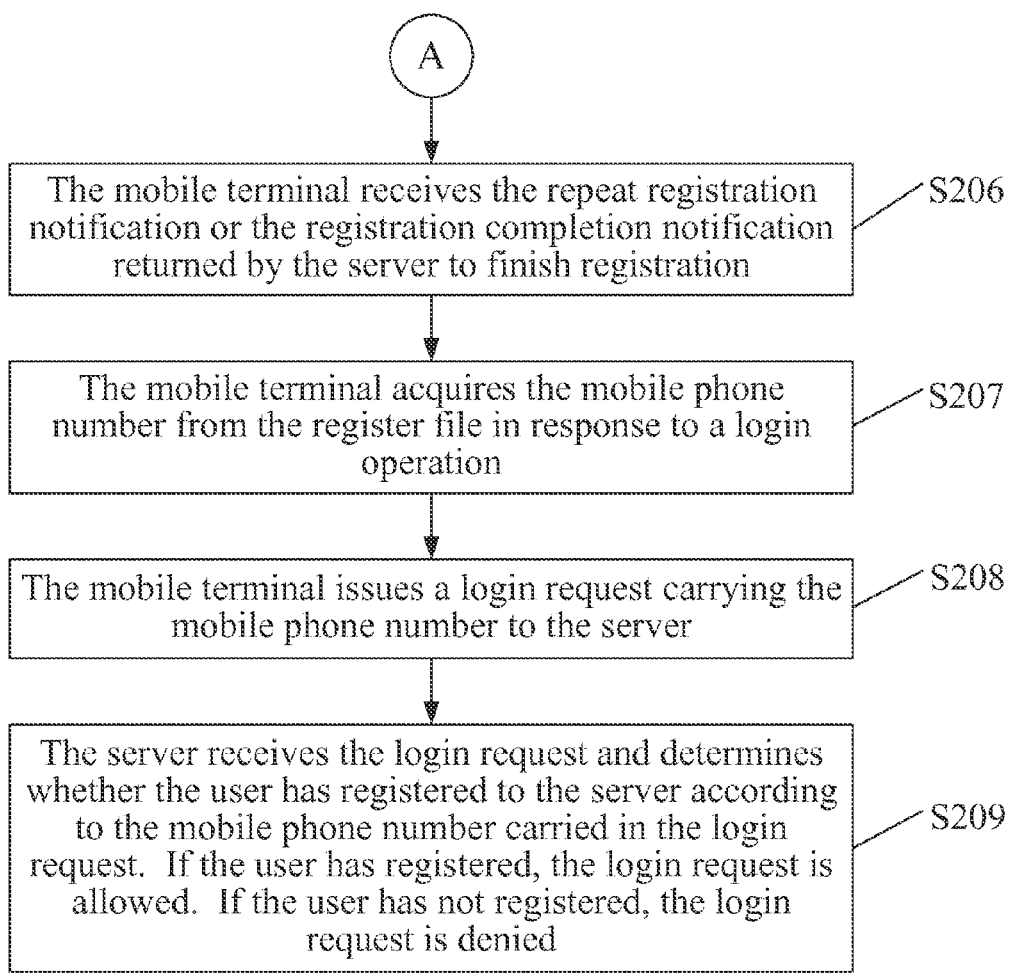

Please refer to FIGS. 2A and 2B, flow charts illustrating another registration and login method. The steps of the registration and login method are described as follows.

In step S201, a mobile terminal sends a default message to a server in response to a registration operation of a user if the mobile terminal judges that no register file is stored in the mobile terminal.

In step S202, the server acquires a mobile phone number of the mobile terminal after receiving the default message, and sends a reply message carrying the mobile phone number to the mobile terminal.

In step S203, the mobile terminal receives the reply message and acquires the mobile phone number in the reply message, and encrypts the mobile phone number into a register file stored in the mobile terminal.

Specifically, to ensure that the mobile phone number is linked with the mobile terminal during the registration and login process, the mobile terminal may acquire a unique identifier of the mobile terminal in response to the registration operation, and encrypts the unique identifier into the register file stored in the mobile terminal. For example, the unique identifier of the mobile terminal is a part number (PN) or an international mobile station equipment identity (IMEI) number.

In step S204, the mobile terminal issues a registration request carrying the mobile phone number to the server.

In step S205, the server receives the registration request, and determines whether the user has registered to the server according to the mobile phone number carried in the registration request. If the user has registered, the server returns a repeat registration notification. If the user has not registered, the server records the mobile phone number and returns a registration completion notification.

In step S206, the mobile terminal receives the repeat registration notification or the registration completion notification returned by the server to finish registration.

It is to be noted that the above-described registration process is applicable regardless of first registration or a registration renewal due to loss of the register file resulting from mobile terminal loss or system re-installation. The only difference is what the server returns to respond to the registration request. For the first registration, the server returns the registration completion notification. For the registration renewal, the server returns the repeat registration notification to inform that the user has previously registered to the server.

In step S207, the mobile terminal acquires the mobile phone number from the register file in response to a login operation of the user.

Furthermore, the mobile terminal may acquire the unique identifier of the mobile terminal from the register file, and compare the acquired unique identifier with a unique identifier of the current mobile terminal. If the acquired unique identifier matches the current unique identifier, it means that the mobile phone number is linked with the current mobile terminal. If the acquired unique identifier does not match the current unique identifier, it means that the register file may be altered or the mobile phone number is not linked with the current mobile terminal. Under a match condition, the method is directed to step S208.

In step S208, the mobile terminal issues a login request carrying the mobile phone number to the server.

In step S209, the server receives the login request and determines whether the user has registered to the server according to the mobile phone number carried in the login request. If the user has registered, the login request is allowed. If the user has not registered, the login request is denied and the server prompts the user to follow a new registration process.

In the embodiment, the mobile terminal acquires the mobile phone number of the mobile terminal through the server in response to a registration operation, and encrypts the mobile phone number into the register file stored in the mobile terminal. The mobile phone number is inputted as the username to register to the server. The mobile phone number is acquired from the register file in response to a login operation and used as the username to log into the server. The user need not input a username or a password, thereby simplifying the input operation during the registration and login process. Furthermore, through a comparison between the unique identifier of the mobile terminal stored in the register file and the unique identifier of the current mobile terminal, it is ensured that the mobile phone number is linked with the current mobile terminal during both the registration process and the login process to avoid illegal login.

Figure 3:
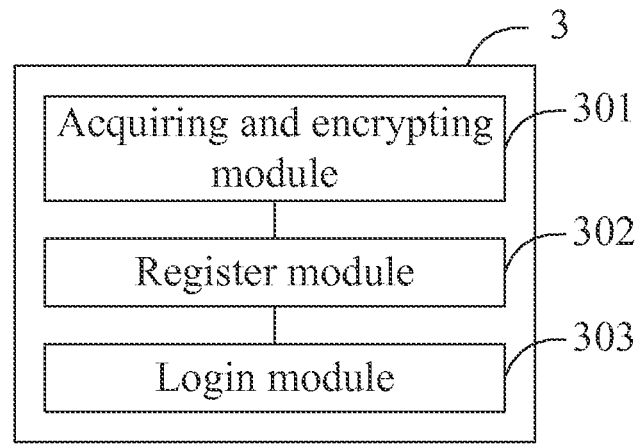
FIG. 3 is a schematic diagram illustrating an embodiment of a mobile terminal.

Please refer to FIG. 3, a schematic diagram illustrating an embodiment of a mobile terminal. The mobile terminal 3 includes an acquiring and encrypting module 301, a register module 302 and a login module 303.

The acquiring and encrypting module 301 is configured to acquire a mobile phone number of the mobile terminal 3 through a server in response to a registration operation of a user, and encrypt the mobile phone number into a register file stored in the mobile terminal 3.

The register module 302 is configured to register to the server by inputting the mobile phone number as a username.

The login module 303 is configured to acquire the mobile phone number from the register file in response to a login operation of the user and log into the server by using the mobile phone number as the username.

Specifically, the acquiring and encrypting module 301, configured to acquire the mobile phone number of the mobile terminal 3 through the server, is further configured to send a default message to the server in response to the registration operation of the user to enable the server to acquire the mobile phone number after receiving the default message if no register file is stored in the mobile terminal 3. The acquiring and encrypting module 301 is further configured to receive a reply message from the server and acquires the mobile phone number carried in the reply message.

Specifically, the register module 302 is configured to issue a registration request carrying the mobile phone number to the server to enable the server to determine whether the user has registered to the server according to the mobile phone number carried in the registration request. If the user has registered, the server returns a repeat registration notification. If the user has not registered, the server records the mobile phone number and returns a registration completion notification. The register module 302 is further configured to receive the repeat registration notification or the registration completion notification returned from the server to finish registration.

Specially, the login module 303, configured to log into the server by using the mobile phone number as the username, is further configured to issue a login request carrying the mobile phone number to the server to enable the server to determine whether the user has registered to the server according to the mobile phone number carried in the login request. If the user has registered, the login request is allowed.

The acquiring and encrypting module 301 is further configured to acquire a unique identifier of the mobile terminal 3 in response to the registration operation, and encrypt the unique identifier of the mobile terminal 3 into the register file stored in the mobile terminal 3. For example, the unique identifier of the mobile terminal is a part number (PN) or an international mobile station equipment identity (IMEI) number.

Figure 4:
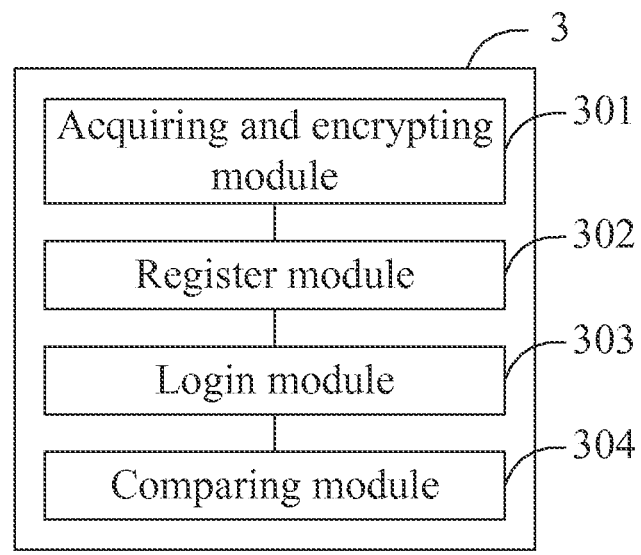
FIG. 4 is a schematic diagram illustrating another embodiment of a mobile terminal.

Please refer to FIG. 4, a schematic diagram illustrating another embodiment of a mobile terminal. The mobile terminal 3 further includes a comparing module 304 configured to acquire the unique identifier of the mobile terminal 3 from the register file, and compare the acquired unique identifier with a unique identifier of the current mobile terminal. If the acquired unique identifier matches the current unique identifier, it means that the mobile phone number is linked with the current mobile terminal. Then, the login module 303 logs into the server by using the mobile phone number as the username.

In the embodiment, the mobile terminal 3 acquires the mobile phone number of the mobile terminal 3 through the server in response to the registration operation of the user, and encrypts the mobile phone number into the register file stored in the mobile terminal 3. The mobile terminal 3 registers to the server by inputting the mobile phone number as the username automatically. In response to the login operation, the mobile terminal 3 acquires the mobile phone number from the register file and logs into the server by using the mobile phone number as the username automatically. The user need not input a username or a password, thereby simplifying the input operation during the registration and login process. Furthermore, through a comparison between the unique identifier of the mobile terminal 3 stored in the register file and the unique identifier of the current mobile terminal, it is ensured that the mobile phone number is linked with the current mobile terminal during both the registration process and the login process to avoid illegal login.

It is to be noted that the mobile terminal in the embodiments of the invention may be a mobile phone or other electronic device with communication function which is identified by a phone number. As used in this specification and any claims of this application, the terms "terminal" and "server" refer to electronic devices. These terms exclude people or groups of people.

The person having ordinary skill in the art can realize that all or part of the technique solutions provided by the above embodiments can be achieved by hardware or programs. The programs can be stored in a computer readable medium such as read only memories (ROM), hard disks or optical disks.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A registration and login method executed by a mobile terminal, comprising steps of:
   the mobile terminal acquiring a mobile phone number of the mobile terminal through a server in response to a registration operation of a user, and encrypting the mobile phone number into a register file stored in the mobile terminal;
   inputting the mobile phone number as a username to register to the server; and
   acquiring the mobile phone number from the register file in response to a login operation and logging into the server by using the mobile phone number as the username;
   wherein the step of acquiring the mobile phone number of the mobile terminal through the server comprises:
   the mobile terminal sending a default message to the server in response to the registration operation if the mobile terminal judges that no register file is stored in the mobile terminal, to enable the server to acquire the mobile phone number of the mobile terminal after receiving the default message; and
   receiving a reply message from the server and acquires the mobile phone number in the reply message.

2. The registration and login method according to claim 1, wherein the step of logging into the server by using the mobile phone number as the username comprises:
   issuing a registration request carrying the mobile phone number to the server to enable the server to determine whether the user has registered to the server according to the mobile phone number carried in the registration request, wherein if the user has registered, the server returns a repeat registration notification, and if the user has not registered, the server records the mobile phone number and returns a registration completion notification; and
   receiving the repeat registration notification or the registration completion notification returned by the server to finish registration.

3. The registration and login method according to claim 1, wherein the step of logging into the server by using the mobile phone number as the username comprises:
   issuing a login request carrying the mobile phone number to the server to enable the server to determine whether the user has registered to the server according to the mobile phone number carried in the login request, wherein if the user has registered, the login request is allowed.

4. The registration and login method according to claim 1, further comprising a step of acquiring a unique identifier of the mobile terminal in response to the registration operation, and encrypting the unique identifier into the register file stored in the mobile terminal.

5. The registration and login method according to claim 4, wherein before the step of logging into the server by using the mobile phone number as the username, the method further comprises:
   acquiring the unique identifier of the mobile terminal from the register file;
   comparing the acquired unique identifier with a unique identifier of the current mobile terminal; and
   executing the step of logging into the server by using the mobile phone number as the username if the acquired unique identifiers matches the current unique identifier.

6. A mobile terminal, comprising:
   an acquiring and encrypting module, configured to acquire a mobile phone number of the mobile terminal through a server in response to a registration operation of a user, and encrypt the mobile phone number into a register file stored in the mobile terminal;
   a register module, configured to register to the server by inputting the mobile phone number as a username; and
   a login module, configured to acquire the mobile phone number from the register file in response to a login operation of the user and log into the server by using the mobile phone number as the username;
   wherein the acquiring and encrypting module, configured to acquire the mobile phone number of the mobile terminal through the server, is further configured to:
   send a default message to the server in response to the registration operation to enable the server to acquire the mobile phone number after receiving the default message if no register file is stored in the mobile terminal; and
   receive a reply message from the server and acquire the mobile phone number carried in the reply message.

7. The mobile terminal according to claim 6, wherein the register module is further configured to:
   issue a registration request carrying the mobile phone number to the server to enable the server to determine whether the user has registered to the server according to the mobile phone number carried in the registration request, wherein if the user has registered, the server returns a repeat registration notification, and if the user has not registered, the server records the mobile phone number and returns a registration completion notification; and
   receive the repeat registration notification or the registration completion notification returned from the server to finish registration.

8. The mobile terminal according to claim 6, wherein the register module, configured to log into the server by using the mobile phone number as the username, is further configured to:
   issue a login request carrying the mobile phone number to the server to enable the server to determine whether the user has registered to the server according to the mobile phone number carried in the login request, wherein if the user has registered, the login request is allowed.

9. The mobile terminal according to claim 6, wherein the acquiring and encrypting module is further configured to acquire a unique identifier of the mobile terminal, and encrypt the unique identifier of the mobile terminal into the register file stored in the mobile terminal.

10. The mobile terminal according to claim 9, further comprising a comparing module, configured to acquire the unique identifier of the mobile terminal from the register file, and compare the acquired unique identifier with a unique identifier of a current mobile terminal, wherein if the acquired unique identifier matches the current unique identifier, the login module logs into the server by using the mobile phone number as the username.

* * * * *